United States Patent [19]
Tanaka

[11] Patent Number: 5,764,343
[45] Date of Patent: Jun. 9, 1998

[54] OPTICAL ELEMENT

[75] Inventor: Kazuyuki Tanaka, Chohu, Japan

[73] Assignee: Olympus Optical Co., Ltd., Tokyo, Japan

[21] Appl. No.: 667,496

[22] Filed: Jun. 21, 1996

[30] Foreign Application Priority Data

Jun. 21, 1995 [JP] Japan ............................ 7-176870

[51] Int. Cl.$^6$ .................................................. G01C 3/00
[52] U.S. Cl. ........................ 356/3.03; 359/558; 396/111
[58] Field of Search ............................ 359/107, 558; 356/3.03; 396/111

[56] References Cited

U.S. PATENT DOCUMENTS

| | | |
|---|---|---|
| 5,239,335 | 8/1993 | Kato . |
| 5,296,724 | 3/1994 | Ogata et al. ............... 257/98 |
| 5,629,800 | 5/1997 | Hamblen ..................... 359/565 |

FOREIGN PATENT DOCUMENTS

| | | |
|---|---|---|
| 61-134716 | 6/1986 | Japan . |
| 4-248509 | 9/1992 | Japan . |

OTHER PUBLICATIONS

SPIE vol. 1354 International Lens Design Conference (1990), Michael W. Farn et al. pp. 24–29 (See Appln. p. 3.
SPIE vol. 1354 International Lens Design conference (1990), Carmina Londono et al. pp. 30–37 (See appln. p. 3.

Applied Optics/vol. 31 No. 13/1 May 1992, Ray Tracing Kinoform Lens Surfaces, William H. Southwell (See Appln. p. 3).

Applied Optics/vol. 31/1 May 1992, Modeling Diffraction Efficiency Effects When Designing Hydrid Diffractive Lens-systems, Carmina Londono et al. pp. 2248–2252.

SPIE vol. 126 clver Optics (1977) New Methods Of Designing Holographic Optical Elements, W.C. Sweatt.

Kogaku vol. 22 No. 3, Mar. 1993, Recent Advances in Holographic Optical Elements, Yuzo Ono pp. 126–130 (See appln. p. 3).

Primary Examiner—Mark Hellner
Attorney, Agent, or Firm—Cushman, Darby & Cushman IP Group of Pillsbury, Madison & Sutro LLP

[57] ABSTRACT

An optical element which has a rear principal point located before a center of its thickness or a front focal point located after the center of its thickness and at least one surface which functions as a lens by utilizing the diffraction phenomenon.

Further, a focal point detecting optical system using a projector optical element or light emitting optical element which has a surface functioning as a lens by utilizing the diffraction phenomenon.

28 Claims, 10 Drawing Sheets

OPTICAL ELEMENT

BACKGROUND OF THE INVENTION a) Field of the invention:

The present invention relates to an optical element utilizing the diffraction phenomenon (hereinafter referred to as a diffraction type optical element). Further, the present invention relates to a focal point detecting optical system comprising diffraction type optical elements, and more specifically a focal point detecting optical system which is to be used in active rangefinding systems for measuring distances to objects to be photographed by projecting infrared rays to the objects and receiving rays reflected from the objects.

b) Description of the prior art:

Optical elements are conventionally configured on the basis of refraction theory. Further, proposed in these days are diffraction type optical elements which utilize the diffraction phenomenon mainly for correcting chromatic aberration and other aberrations.

First, description will be made of the active range finding systems. Conventional automatic focusing systems for cameras, etc. are classified roughly into two types: one being a passive type which measures distances on the basis of luminance distributions on objects to be photographed, and the other being the active type which projects infrared rays or the like to objects to be photographed and measures distances by using signals reflected by the objects.

Out of these two types, adopted for a large number of optical products are automatic focusing units utilizing the so-called infrared active trigonometrical survey which measures a distance to an object to be photographed by projecting infrared rays through a projector lens to the object, receiving rays reflected from the object with a semiconductor position detecting device through a light receiving lens disposed at a definite distance, i.e., a base length, from the projector lens and determing a distance dependently on locations of incidence of the reflected rays since these focusing units can have simple compositions.

Out of these automatic focusing units, an active automatic focusing unit which has a range finding zone only at a center of a screen has a defect that a main object which is to be photographed is placed out of focus, but another object or a background, i.e., an object located at infinite distance is brought in focus when rays are projected in a direction outside the main object to be photographed.

For correcting this defect, there has been proposed a technology called wide-field automatic focusing or multipoint range finding which is configured to measure distances to a plurality of points visible within a viewfinder by using a plurality of signals projected for range finding and light projecting optical systems (projector optical systems) required for this technology have been disclosed, for example, by Japanese Patent Kokai Publication No. Hei 4-248509. Further, it is demanded these days to reduce dimensions of compact cameras which use the active automatic focusing units described above.

Now, description will be made of the diffraction type optical elements mentioned above. A diffraction type optical element is introduced in "KOGAKU" Vol. 22, p126 through p130, and an image pickup optical system using diffraction type optical elements is proposed by SPIE Vol. 1354, p24 through p29 and p30 through p37. Further, description is made in "Applied Optics" Vol. 31, No. 13.

A diffraction type optical element DOE utilizes the diffraction phenomenon. When an angle of incidence is represented by $\theta$, an angle of emergence is designated by $\theta'$, an order of diffraction is denoted by m and a pitch of grooves on a diffraction grating G is represented by d as shown in FIG. 1, the diffraction phenomenon occurs as expressed by the following equation (11):

$$\sin\theta - \sin\theta' = m\lambda/d \tag{11}$$

Known as one of focal point detecting optical systems which utilize the diffraction phenomenon described above is an optical system disclosed by Japanese Patent Kokai Publication No. Sho 61-134,716. This optical system uses a light beam having a plurality of diffraction orders which are split by the diffraction phenomenon so as to have equal light intensities.

When attention is paid to a light beam which has a single diffraction order, on the other hand, it is possible to concentrate diffracted rays of m'th order, or obtain a function of a lens, as shown in FIG. 2 by continuously varying a pitch d. It is possible to obtain 100% of diffracted rays of m'th order from an incident light beam having wavelength $\lambda$ by configuring the DOE so as to have a saw-tooth shape, such as that shown in FIG. 3, which has a peak height satisfying the relationship expressed by the following formula (12):

$$h = m\lambda/(n-1) \tag{12}$$

wherein the reference symbol n represents a refractive index of a material of the DOE.

The saw-tooth shape such as that shown in FIG. 3 is referred to as kinoform. DOE's which have stepped shapes obtained by approximation to the kinoform as shown in FIG. 4A and FIG. 4B are called binary optics. It is known that diffraction efficiencies of 81%, 95% and 99% can be obtained with a binary optic having the four steps shown in FIG. 4A, a binary optic having the eight steps shown in FIG. 4B and a binary optic having sixteen steps respectively.

Further, as understood from the equation (11), a lens composed of the DOE has a focal length which has a wavelength characteristic expressed by the equation (13) shown below, or $v_d = -3.45$ in terms of the so-called Abbe's number, and a strong inverse dispersing power:

$$\lambda f(\lambda) = \text{constant} \tag{13}$$

wherein the reference symbol $f(\lambda)$ represents a focal length of the lens composed of the DOE at wavelength $\lambda$.

Further, a diffraction efficiency k at the wavelength $\lambda$ of a kinoform which is configured to obtain a diffraction efficiency of 100% at a wavelength $\lambda$ can be determined by the following equation (14):

$$k = \sin^2[\pi(\lambda_0/\lambda - m)]/[\pi(\lambda_0/\lambda - m)]^2 \tag{14}$$

For shortening a total length of an optical element, it is required to displace its rear principal point forward. For this purpose, it is therefore necessary to impart a positive refractive power and a negative refractive power to a lens surface located on a side of an object to be photographed and a surface disposed on a side of an image surface of the lens. In the case of a lens which has a large numerical aperture, however, aberrations are aggravated by imparting a strong power to the lens or rays cannot pass through the lens when too strong a power is imparted to it.

In other words, it is necessary to use a meniscus lens for composing an optical system having a short total length of ordinary optical elements. However, the meniscus shape is unsuited for a lens which is to have a strong refractive power since the convex surface produces remarkable aberrations as shown in FIG. 5 and the lens cannot have a sufficient function of an optical element when an attempt is made to impart a strong positive refractive power to the lens as a whole and reserve a sufficient lens diameter while maintaining a negative refractive power of the concave surface.

SUMMARY OF THE INVENTION

A primary object of the present invention is to provide an optical element which has a simple composition, is almost free from degradation of its optical characteristics or reduction in intensity of light passing through it and allows its rear or front principal paint to be displaced forward or backward.

Another object of the present invention is to provides a focal point detecting optical system which has a simple composition and small thickness, and is almost free from degradation of its optical characteristics or reduction in intensity of light passing through it.

The optical element according to the present invention is characterized in that it has a rear principal point located before a center of its thickness or a front principal point located after the center of its thickness and that it has at least one surface which functions as a lens by utilizing the diffraction phenomenon.

As described above, the optical element according to the present invention has at least one surface which functions as a lens by utilizing the diffraction phenomenon. By using at least one surface which is macroscopically planar but has a function of a lens by utilizing the diffraction phenomenon (referred to as a DOE surface), it is possible to configure a single lens so as to have a strong refractive power. In other words, it is possible to configure a DOE surface of an optical element as a planar surface (refracting surface) which is nearly perpendicular to an optical axis independently of heights of its portions as measures from the optical axis. When a refraction type lens is compared with a lens (optical element) which has the same power as that of the refraction type lens and DOE surface as shown in FIG. 6, a ray, out of those emitted from a point 0 on the optical axis, is incident higher on the refraction type than or the lens having the DOE surface as the ray has a larger angle relative to the optical axis. Accordingly, the refraction type lens produces aberrations in larger amounts and has a shorter practically usable effective diameter than the lens having the DOE surface.

As understood from the foregoing description, the optical element according to the present invention can be configured as an optical element which has a rear principal point located before a center of its thickness or a front principal point located after the center of its thickness, and is bright and free from degradation of its optical performance.

When the optical element according to the present invention has a single DOE surface which scarecely allows light intensity to be reduced due to degradation thereof, it is usable for composing- an optical system which is bright and has a short total length.

When the optical element according to the present invention is to have a single DOE surface as described above, it is desirable to configure the optical element so as to satisfy the following condition (1):

$$5.3 \times \phi_T \times n/D < \phi < 19 \times \phi_T \times n/D \tag{1}$$

wherein the reference symbol $\phi_T$ represents a power of the optical element as a whole, the reference symbol $\phi$ designates a power of the diffracting surface of the optical element, the reference symbol n denotes a refractive index of the optical element and the reference symbol D represents an effective diameter of the optical element.

If the power $\phi$ of the diffracting surface is below the lower limit of $5.3 \times \phi_T$ n/D of the condition (1), it will be impossible to displace the rear principal point sufficiently forward. If the upper limit of $19 \times \phi_T \times n/D$ of the condition (1) is exceeded, in contrast, it will be impossible to correct aberrations favorably even by using the DOE surface.

Further, it is possible to obtain an optical element which has a rear principal point displaced further forward or an optical system which has a higher aberration correcting capability by using DOE surfaces on both side surfaces of an optical element. When the optical element is to have DOE surfaces on both sides thereof, it is desirable to configure it so as to satisfy the following condition (2):

$$8 \times \phi_T \times n/D < \phi < 19 \times \phi_T \times n/D \tag{2}$$

If the refractive power of the diffracting surface is below the lower limit of $8 \times \phi_T \times n/D$ of the condition (2), the rear principal point will be located in or after the optical element. If the upper limit of $9 \times \phi_T \times n/D$ of the condition (2) is exceeded, in contrast, it will be impossible to correct aberrations favorably even by using the DOE surfaces.

The foregoing description of the condition (1), condition (2) and so on has been made taking as an example an optical element which has a rear principal point located before a center of its thickness. When this optical element is disposed in the reverse direction, however, it is an optical element which has a front principal point located after a center of its thickness. Therefore, the foregoing description, the condition (1) and the condition (2) are applicable with no modification to an optical element which has a front principal point located after a center of its thickness.

The optical element according to the present invention can easily be manufactured when at least one of the DOE surfaces is configured as a macroscopically planar surface.

By configuring at least one of DOE surfaces to be used on an optical element as a surface having macroscopic curvature, it is possible to obtain a larger freedom to deflect rays with DOE surfaces and an optical element having a high aberration correcting capability.

Further, it is possible to configure a DOE surface of an optical element so that its central portion and marginal portion have powers which are different from each other. An optical element having a high aberration correcting capability can be composed by using such a DOE surface.

Furthermore, the present invention provides a focal point detecting optical system comprising a light emitting means and a focal point detecting optical element having a projector optical element for projecting light emitted from the light emitting means toward an object to be photographed wherein the projector optical element uses at least one DOE surface.

By configuring the projector lens (light projecting optical element) so as to have a DOE surface on a side of an object to be detected, it is possible to obtain a thin projector lens which has a short total length, permits locating its rear principal point on a side of an object to be photographed and is free from degradation of its optical characteristics or reduction in light intensity as described above.

Furthermore, by using a DOE surface on a side of a light emitting surface of the projector lens, it is possible to compose a bright optical system having a DOE surface which can hardly be contaminated.

It is desirable that an optical element which is to be used in the above-mentioned optical system is configured so as to satisfy the following condition (3):

$$4.6 \times \phi_T \times n/D < \phi < 19 \times \phi_T \times n/D \quad (3)$$

If the lower limit of $4.6 \times \phi_T \times n/D$ of the condition (3) is not reached, the projector optical system will have a large total length as a whole. If the upper limit of $19 \times \phi_T \times n/D$ of the condition (3) is exceeded, in contrast, the DOE surface will have too strong a refractive power and degraded optical performance.

When a DOE surface is to be used on an optical element, this surface may be a binary optic which has a stepped shape approximated to a saw-tooth shape called kinoform. When a DOE surface is to have a strong refractive power, it is required for enhancing an efficiency for a diffraction order to reserve a large difference in groove pitches on the saw-tooth shape between a central portion and a marginal portion, thereby making it difficult to manufacture the DOE surface and constituting a cause to enhance manufacturing cost due to lowering of yield, etc. This problem can be solved by selecting different diffraction orders for the central portion and the marginal portion. For example, a diffraction efficiency of 100% on the first order and a diffraction efficiency of 100% on the second order may be selected for the central portion and the marginal portion respectively.

Moreover, the light emitting element has a spectral characteristic in the infrared region so that an object to be photographed will not be dazzling. It is desirable to match a wavelength at which light emitted from the light emitting element has a maximum energy with a wavelength at which the DOE surface exhibits a maximum diffraction efficiency.

In addition, an optical system having a high aberration correcting capability can be obtained by selecting different powers which are different from each other for a central portion and a marginal portion thereof.

DETAILED DESCRIPTION OF THE PREFERRED EMBODIMENTS

Figure 1:
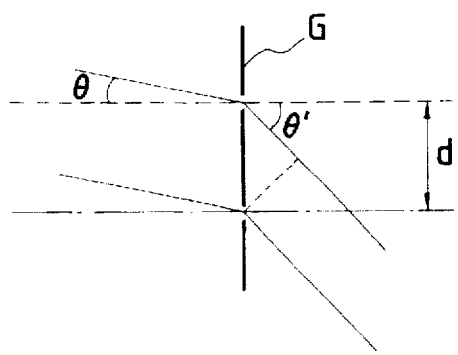
FIG. 1 shows a diagram illustrating a function of a surface serving as a lens by utilizing the diffraction phenomenon.
Figure 2:
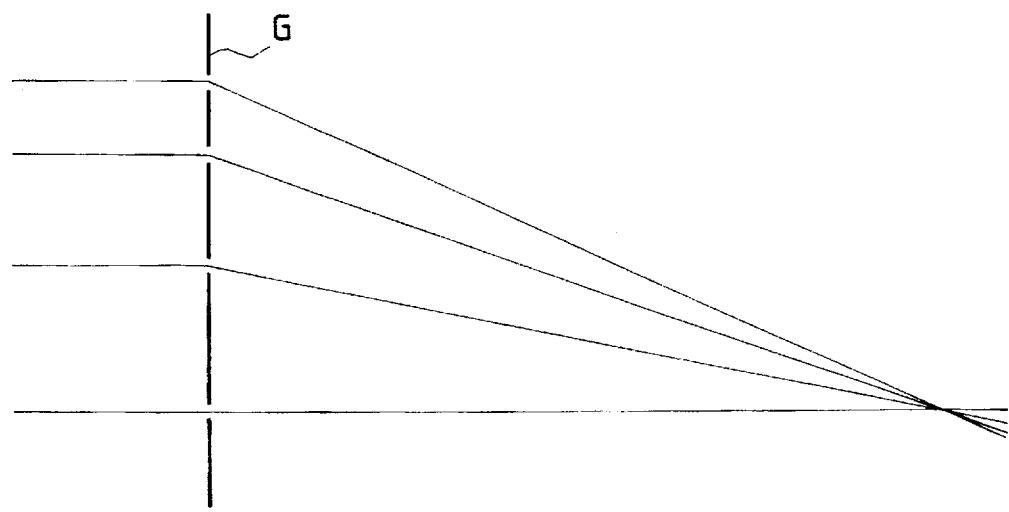
FIG. 2 shows a diagram illustrating a function, only on a single order, of the surface serving as a lens by utilizing the diffraction phenomenon.
Figure 3:
FIG. 3 shows a diagram illustrating a section of a DOE surface having the kinoform shape.
Figure 4A:
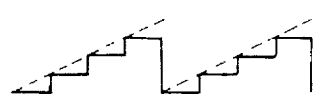
FIGS. 4A and 4B show sectional views illustrating binary optics which have stepped shapes approximated to the kinoform.
Figure 4B:
Figure 5:
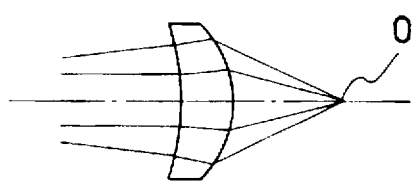
FIG. 5 shows a diagram Illustrating conditions of rays which are refracted by a refraction type optical element having a meniscus shape.
Figure 6:
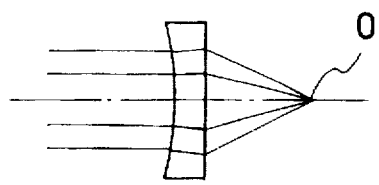
FIG. 6 shows a diagram illustrating conditions of rays which are refracted by an optical element having a surface functioning as a lens by utilizing the diffraction phenomenon.
Figure 7:
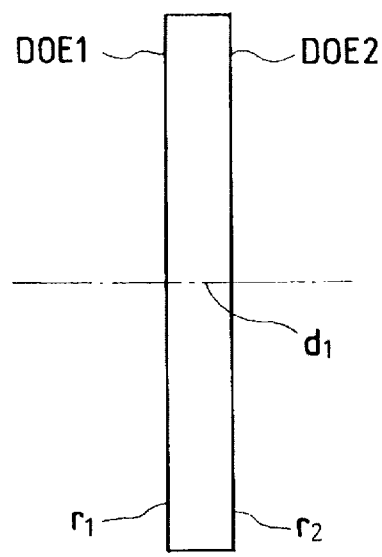
FIG. 7 shows a sectional view illustrating a first embodiment of the optical element according to the present invention.

Now, the optical element according to the present invention will be described in more detail below with reference to the preferred embodiment. A first embodiment of the optical element according to the present invention has a composition illustrated in FIG. 7 wherein the- optical element is configured so as to have DOE surfaces on both sides thereof and numerical data listed below:

$r_1 = \infty$ (DOE surface)
$r_2 = \infty$ (DOE surface)
$d_1 = 1.14$   $n_1 = 1.485$   $v_1 = 57.66$
aspherical surface coefficients
(surface $r_1$)   $P = 243$, $E = -0.8182 \times 10^{-6}$,
                  $F = 0.2368 \times 10^{-8}$, $G = -0.1007 \times 10^{-9}$
(surface $r_2$)   $P = 1.82 \times 10^6$, $E = -0.1513 \times 10^{-5}$,
                  $F = 0.8584 \times 10^{-8}$, $G = -0.8591 \times 10^{-10}$ In the first embodiment described above, both the DOE surfaces are designed by the ultra-high index methods, and have a refractive index of 148 and an Abbe's number of −3.45. The surface $r_1$ has a refractive power of 0.237, whereas the surface $r_2$ has a refractive power of 0.168. Further, the first embodiment has a rear principal point at a location 0.68 mm as measured from a vertex of the first surface ($r_1$) toward an object to be photographed.

Now, description will be made of a second embodiment of the present invention which is an application example of the optical element according to the present invention to an active range finding system.

Figure 8:
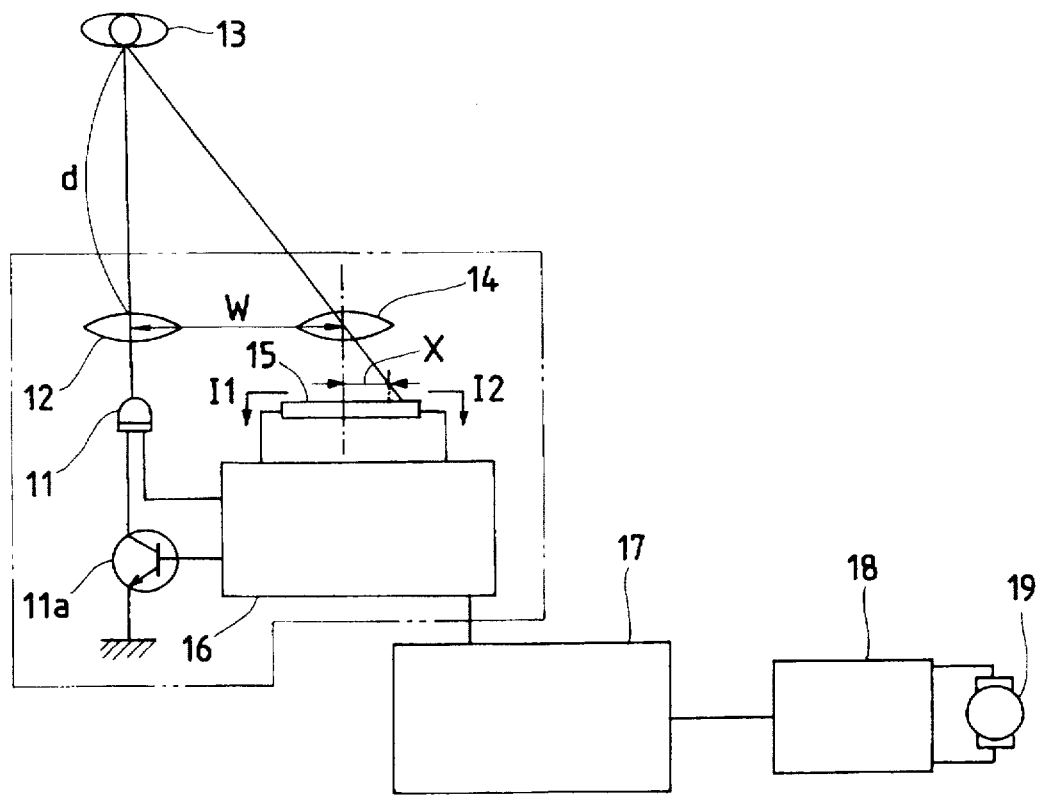
FIG. 8 shows a sectional view illustrating a composition of an active trigonometrical survey unit for single-point range finding to which a second embodiment of a focal point detecting optical system according to the present invention is applicable.

First, an active trigonometrical survey unit for measuring a distance to a single point will be described. FIG. 8 shows a block diagram of main components of a focal point detecting system for carrying out the active range finding according to the present invention. In this drawing, a reference numeral 11 represents an infrared light emitting diode (IRED), a reference numeral 11a designates a diode for controlling the infrared light emitting diode 11, a reference numeral 12 denotes a projector lens which condenses rays emitted from the infrared light emitting diode 11, a reference numeral 13 represents an object to be photographed, a reference numeral 14 designates a light receiving lens, a reference numeral 15 denotes a known detector composed of semiconductors (hereinafter abbreviated as PSD), a reference numeral 16 represents an IC for automatic focusing, a reference numeral 17 designates a control means which performs calculations for driving the focus adjusting lens, a reference numeral 18 denotes a driver and a reference numeral 19 denotes a motor for driving a photographic lens system for focusing. Further, the control means 17 comprises a CPU which provides output for driving the motor 19 adopted as a driving power source for displacing the photographic lens system by the driver.

Now, description will be made of an operating principle of the infrared active trigonometrical survey to be performed by a system having the configuration described above.

When an optical axis of the light receiving lens 14 is aligned with a center line of the PSD 15, and an intersection between the optical axis and a light receiving surface is taken as an origin, a distance d to the object to be photographed 13 is given by the following equation (21):

$$d = W \cdot f / x \tag{21}$$

wherein the reference symbol x represents a location at which a ray reflected by the object to be photographed is incident on the light receiving lens 14, the reference symbol W designates a distance between principal points of the projector lens 12 and the light receiving lens 14, i.e., a base length, and the reference symbol f denotes a focal length of the light receiving lens 14.

When the ray is reflected by the object to be photographed and received by the PSD 15, it produces photoelectric currents $I_1$ and $I_2$ which are proportional to an intensity of the incident ray. However, a ratio $I_1/I_2$ between the photoelectric currents is independent of the intensity of the incident ray and determined dependently on the location of incidence x. When a total length of the PSD 15 is represented by t, $I_1/I_2$ is given by the following equation (22):

$$I_1/I_2 = (t/2 + x)/(t/2 - x) \tag{22}$$

From the equations (21) and (22) mentioned above, $I_1/I_2$ is determined by the formula (23) shown below:

$$I_1/I_2 = (t + 2W \cdot f/d)/(t - 2W \cdot f/d) \tag{23}$$

Hence, the distance d to the object to be photographed can be determined uniquely so far as the ratio $I_1/I_2$ between the photoelectric currents provided by the PSD 15 can be calculated.

Figure 9:
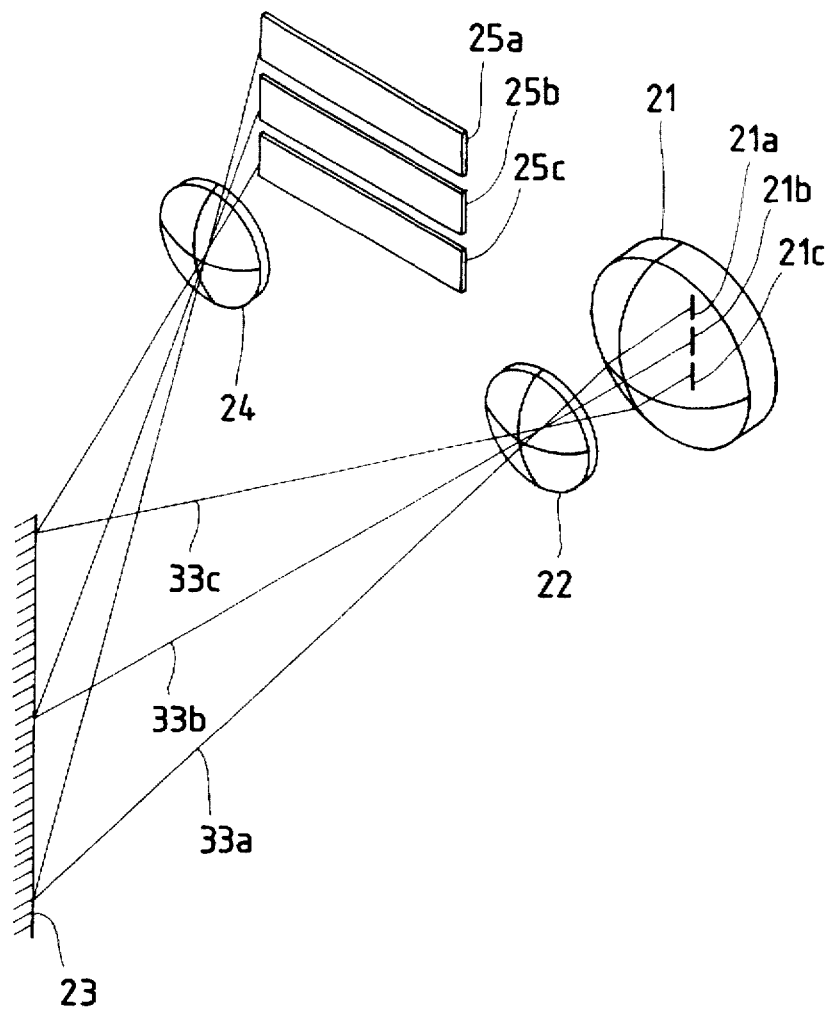
FIG. 9 shows a perspective view illustrating a composition of an active trigonometrical survey unit for three-point range finding to which the second embodiment of the present invention is applicable.

The active trigonometrical survey unit shown in FIG. 8 is configured for measuring a distance to a single point for simplicity of description, whereas a trigonometrical survey unit which is configured for measuring distances to three points has a configuration illustrated in FIG. 9.

In FIG. 9, three PSD's 25a, 25b and 25c are used for three infrared light emitting diodes 21a, 21b and 21c, and three diverging infrared beams 33a, 33b and 33c emitted from the three infrared light emitting diodes 21a, 21b and 21c respectively are converged by a package 21, and further transformed by a light projector lens 22 into nearly parallel light beans to be projected to an object to be photographed 23. Each of the light beam is reflected by the object to be photographed 23, received by a light receiving lens 24 and incident on one of the three PSD's 25a, 25b and 25c which corresponds to the light beam.

Influences due to rays incident in different directions and an S/N ratio of the trigonometric survey unit can be reduced and enhanced respectively by dividing the PSD into three as described above.

Described below are some examples of the projector optical system which is composed of the light projector lens (projector optical element) and the package 21, and is to be used in the second embodiment of the focal point detecting optical system according to the present invention.

Figure 10:
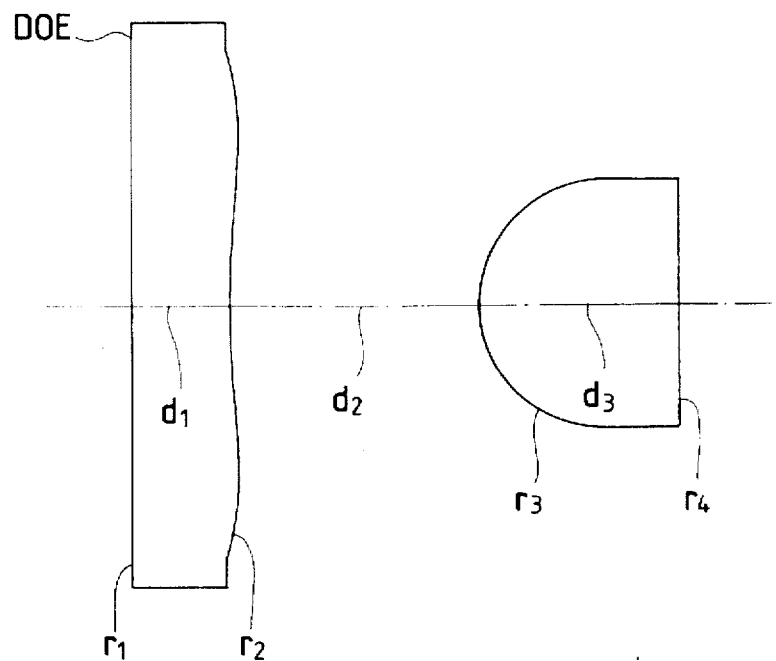
FIG. 10 shows a sectional view illustrating a first example of a projector optical system to be used in the second embodiment of the present invention.

FIG. 10 illustrates a first example of the projector optical system which has the numerical data listed below:

first example

| $r_1 = \infty$ (DOE surface) | | |
|---|---|---|
| $d_1 = 1.56$ | $n_1 = 1.485$ | $v_1 = 57.66$ |
| $r_2 = 13.328$ | | |
| $d_2 = 3.91$ | | |
| $r_3 = 1.97$ | | |
| $d_3 = 3.17$ | $n_2 = 1.54$ | $v_2 = 54$ |
| $r_4 = \infty$ | | |
| aspherical surface coefficients | | |
| (surface $r_1$) | $P = 659, E = -0.5616 \times 10^{-6}$, | |
| | $F = 0.6330 \times 10^{-8}, G = -0.5259 \times 10^{-9}$ | |
| (surface $r_2$) | $P = -29, E = -0.1067 \times 10^{-2}$, | |
| | $F = -0.7232 \times 10^{-4}, G = -0.1693 \times 10^{-5}$ | |

This projector optical system (first example) uses the surface $r_1$ which is a DOE surface designed by the ultra-high index methods. This DOE surface (ultra-high index lens) has a refractive index of 1487 and an Abbe's number of −3.45. The surface $r_1$ has a refractive power of 0.139 and the surface $r_2$ has a refractive power of −0.036. A rear principal point is located −0.18 mm as measured from a vertex of the first surface toward an object to be photographed. The surface $r_2$ is an aspherical surface.

The projector optical system (first example) which uses the first surface configured as a macroscopically planar DOE surface has a short total length and high transmittance, and can easily be manufactured in practice.

Figure 11:
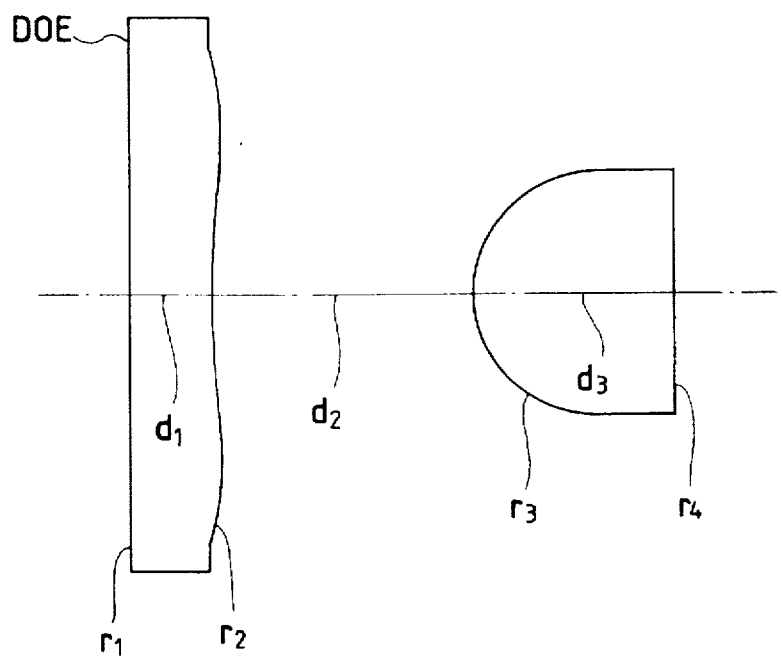
FIG. 11 shows a sectional view illustrating a second example of the projector optical system to be used in the second embodiment of the present invention.

FIG. 11 shows another projector optical system (second example) which has the following numerical data:

second example

| $r_1 = 3237$ (DOE surface) | | |
|---|---|---|
| $d_1 = 1.304$ | $n_1 = 1.485$ | $v_1 = 57.66$ |
| $r_2 = 12.62$ | | |
| $d_2 = 4.122$ | | |
| $r_3 = 1.97$ | | |
| $d_3 = 3.17$ | $n_2 = 1.54$ | $v_2 = 54$ |
| $r_4 = \infty$ | | |
| aspherical surface coefficients | | |
| (surface $r_1$) | $P = 2582, E = -0.6618 \times 10^{-6}$, | |
| | $F = 0.6620 \times 10^{-8}, G = -0.4955 \times 10^{-9}$ | |
| (surface $r_2$) | $P = -27, E = -0.1105 \times 10^{-2}$, | |
| | $F = -0.7817 \times 10^{-4}, G = 0.2078 \times 10^{-5}$ | |

This projector optical system (second example) adopts the surface $r_1$ which is a DOE surface designed by the ultra-high index methods. The DOE surface (ultra-high index lens) has a refractive index of 1487 and an Abbe's number of −3.45. The surface $r_1$ has a refractive power of 0.134, whereas the surface $r_2$ has a refractive power of −0.038. The second example has a rear principal point at a location −0.12 mm as measured from a vertex of the first surface toward an object to be photographed. The surfaces $r_1$ and $r_2$ are aspherical surfaces.

This projector optical system (second example) which adopts the first surface designed as a macroscopically planar DOE surface has a short total length and high transmittance, and can be easily manufactured in practice.

Figure 12:
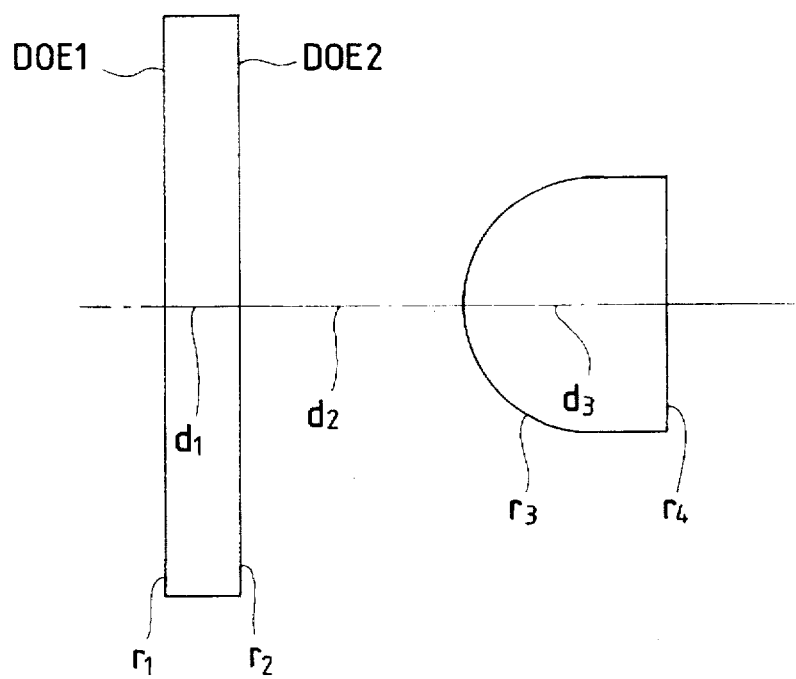
FIG. 12 shows a sectional view illustrating a third example of the projector optical system to be used in the second embodiment of the present invention.

FIG. 12 illustrates still another projector optical system (third example) which has numerical data listed below:

third example

| | | |
|---|---|---|
| $r_1 = \infty$ (DOE surface 1) | | |
| $d_1 = 1.142$ | $n_1 = 1.485$ | $\nu_1 = 57.66$ |
| $r_2 = \infty$ (DOE surface 2) | | |
| $d_2 = 3.474$ | | |
| $r_3 = 1.97$ | | |
| $d_3 = 3.17$ | $n_2 = 1.54$ | $\nu_2 = 54$ |
| $r_4 = \infty$ | | |
| aspherical surface coefficients | | |
| (surface $r_1$) | $P = 243$, $E = -0.8182 \times 10^{-6}$, | |
| | $F = 0.2368 \times 10^{-8}$, $G = -0.1007 \times 10^{-9}$ | |
| (surface $r_2$) | $P = 1.82 \times 10^6$, $E = -0.1513 \times 10^{-5}$, | |
| | $F = 0.8584 \times 10^{-8}$, $G = -0.8591 \times 10^{-10}$ | |

The surfaces $r_1$ and $r_2$ of this projector optical system are a DOE surface 1 and another DOE surface 2 respectively which are designed by the ultra-high index methods. Each of these DOE surfaces (ultra-high index lenses) has a refractive index of 1487 and an Abbe's number of −3.45. The surfaces $r_1$ and $r_2$ have refractive powers of 0.237 and −0.168 respectively. The projector optical system has a rear principal point at a location 0.68 mm as measured from a vertex of the first surface toward an object to be photographed. The surfaces $r_1$ and $r_2$ are configured as aspherical surfaces.

Since the projector optical system adopts the first surface and the second surface which are configured as macroscopically planar DOE surfaces, it has a short total length and high transmittance and is configured for facilitated manufacturing.

Figure 13:
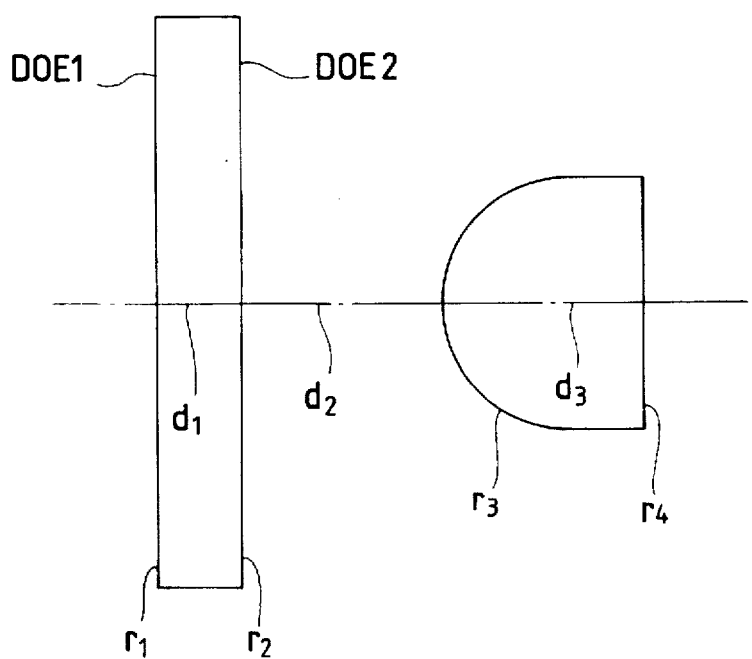
FIG. 13 shows a sectional view illustrating a fourth example of the projector optical system to be used in the second embodiment of the present invention.

Shown in FIG. 13 is a fourth example of the projector optical system which has the following numerical data:

fourth example

| | | |
|---|---|---|
| $r_1 = \infty$ (DOE surface 1) | | |
| $d_1 = 1.299$ | $n_1 = 1.485$ | $\nu_1 = 57.66$ |
| $r_2 = -6293$ (DOE surface 2) | | |
| $d_2 = 3.117$ | | |
| $r_3 = 1.97$ | | |
| $d_3 = 3.17$ | $n_2 = 1.54$ | $\nu_2 = 54$ |
| $r_4 = \infty$ | | |
| aspherical surface coefficients | | |
| (surface $r_1$) | $P = 181$, $E = -0.7862 \times 10^{-6}$, | |
| | $F = 0.3153 \times 10^{-8}$, $G = -0.1095 \times 10^{-9}$ | |
| (surface $r_2$) | $P = 1.82 \times 10^6$, $E = -0.1582 \times 10^{-5}$, | |
| | $F = 0.7178 \times 10^{-8}$, $G = -0.3375 \times 10^{-11}$ | |

This projector optical system (fourth example) uses the surfaces $r_1$ and $r_2$ which are DOE surfaces 1 and 2 respectively designed by the ultra-high index methods. Each of these DOE surfaces (ultra-high index lenses) has a refractive index of 1487 and an Abbe's number of −3.45. The surface $r_1$ has a refractive power of 0.249, whereas the surface $r_2$ has a refractive power of −0.191. The projector optical system has a rear principal point at a location 0.88 mm as measured from the first surface toward an object to be photographed. The surfaces $r_1$ and $r_2$ are configured as aspherical surfaces.

Owing to a fact that the projector optical system (fourth example) uses the first surface which is a macroscopically planar DOE surface and the second surface which is a macroscopically curved surface, it has a short total length and high aberration correcting capability.

Figure 14:
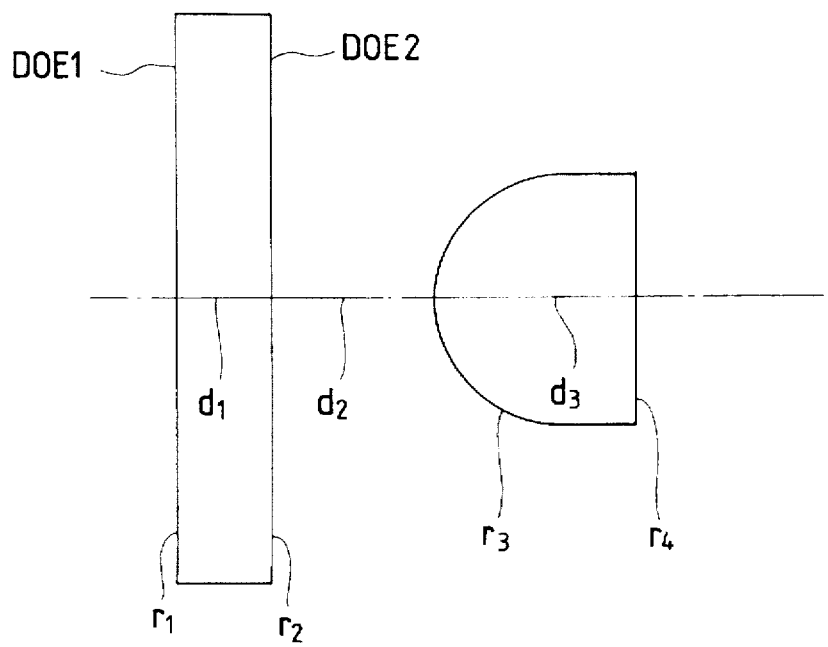
FIG. 14 shows a sectional view illustrating a fifth example of the projector optical system to be used in the second embodiment of the present invention.

FIG. 14 shows still another projector optical system (fifth example) which has the numerical data listed below:

fifth example

| | | |
|---|---|---|
| $r_1 = 611.5$ (DOE surface 1) | | |
| $d_1 = 1.852$ | $n_1 = 1.485$ | $\nu_1 = 57.66$ |
| $r_2 = \infty$ (DOE surface 2) | | |
| $d_2 = 3.474$ | | |
| $r_3 = 1.97$ | | |
| $d_3 = 3.17$ | $n_2 = 1.54$ | $\nu_2 = 54$ |
| $r_4 = \infty$ | | |
| aspherical surface coefficients | | |
| (surface $r_1$) | $P = 277$, $E = -0.1366 \times 10^{-5}$, | |
| | $F = 0.7109 \times 10^{-8}$, $G = -0.1949 \times 10^{-10}$ | |
| (surface $r_2$) | $P = 1.82 \times 10^6$, $E = -0.2119 \times 10^{-5}$, | |
| | $F = 0.1206 \times 10^{-6}$, $G = 0.3960 \times 10^{-9}$ | |

This projector optical system (fifth example) adopts the surfaces $r_1$ and $r_2$ which are a DOE surface 1 and another DOE surface 2 designed by the ultra-high index methods. Each of these DOE surfaces (ultra-high index lenses) has a refractive index of 1487 and an Abbe's number of −3.45. Refractive powers of the surfaces $r_1$ and $r_2$ are 0.226 and −0.177 respectively. The projector optical system has a rear principal point at a location 0.98 mm as measured from the first surface toward an object to be photographed. The surfaces $r_1$ and $r_2$ are aspherical surfaces. This projector optical system has a short total length and a high aberration correcting capability since the first surface is a macroscopically curved DOE surface and the second surface is a macroscopically planar surface.

Figure 15:
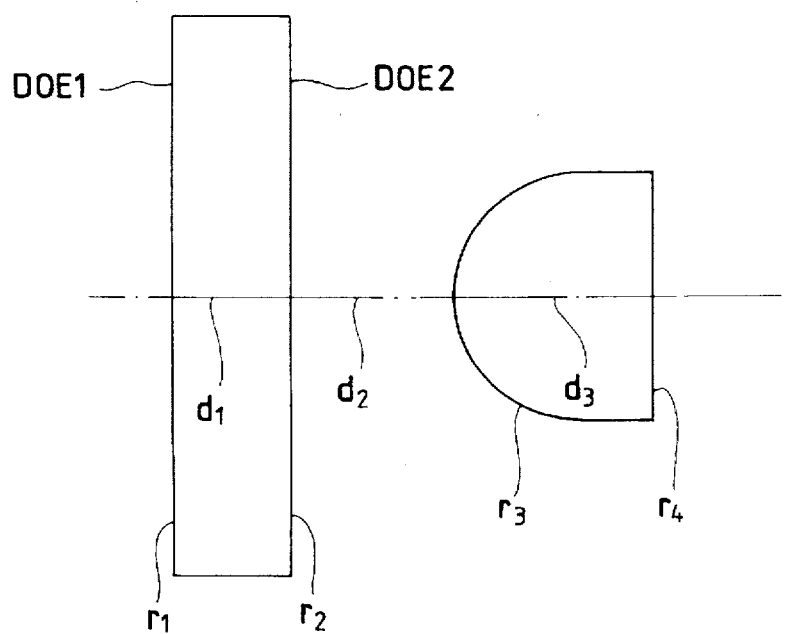
FIG. 15 shows a sectional view illustrating a sixth example of the projector optical system to be used in the second embodiment of the present invention.

Illustrated in FIG. 15 is still another projector optical system (sixth example) which has the following numerical data:

sixth example

| | | |
|---|---|---|
| $r_1 = 1151.8$ (DOE surface 1) | | |
| $d_1 = 1.517$ | $n_1 = 1.485$ | $\nu_1 = 57.66$ |
| $r_2 = -1674.9$ (DOE surface 2) | | |
| $d_2 = 2.499$ | | |
| $r_3 = 1.97$ | | |
| $d_3 = 3.17$ | $n_2 = 1.54$ | $\nu_2 = 54$ |
| $r_4 = \infty$ | | |
| aspherical surface coefficients | | |
| (surface $r_1$) | $P = 298$, $E = -0.8955 \times 10^{-6}$, | |
| | $F = 0.4396 \times 10^{-9}$, $G = -0.1655 \times 10^{-9}$ | |
| (surface $r_2$) | $P = 1.82 \times 10^5$, $E = -0.1978 \times 10^{-5}$, | |
| | $F = -0.7943 \times 10^{-8}$, $G = 0.8586 \times 10^{-9}$ | |

The sixth example of the projector optical system has the surfaces $r_1$ and $r_2$ which are a DOE surface 1 and another DOE surface 2 designed by the ultra-high index methods. A refractive index of 1487 and an Abbe's number of −3.45 are selected for each of these DOE surfaces (ultra-high index lenses). The surfaces $r_1$ and $r_2$ have refractive power of 0.226 and −0.177 respectively. The projector optical system has a rear principal point a at distance of 0.98 mm from a vertex of the first surface toward an object to be photographed. Further, the surfaces $r_1$ and $r_2$ are configured as aspherical surfaces.

Owing to a fact that both the first and second surfaces are macroscopically curved DOE surfaces, the projector optical system (sixth example) has a short total length and a high aberration correcting capability.

Figure 16:
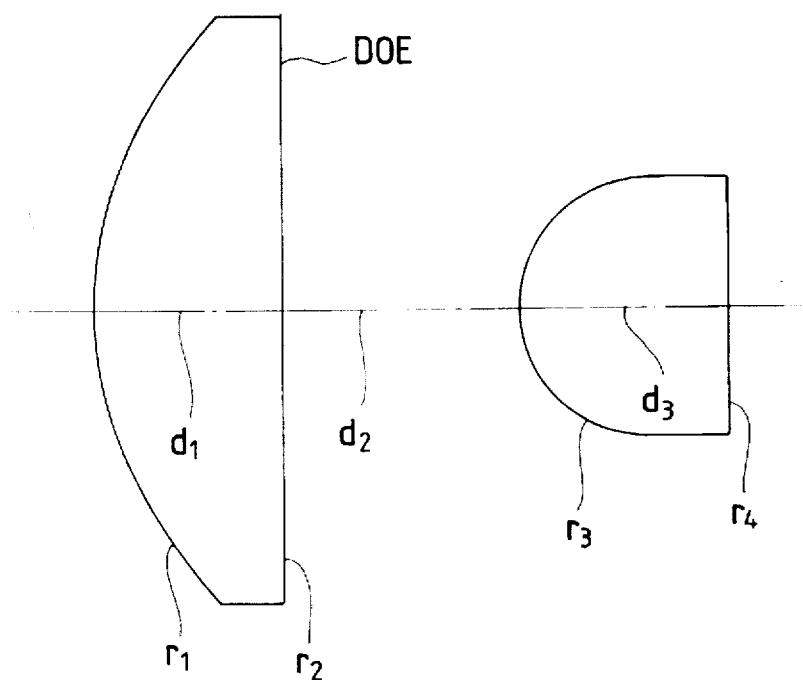
FIG. 16 shows a sectional view illustrating a seventh example of the projector optical system to be used in the second embodiment of the present invention.

Shown in FIG. 16 is a seventh example of the projector optical system having the numerical data which is listed below:

seventh example

| | | |
|---|---|---|
| $r_1 = 5.61$ | | |
| $d_1 = 2.85$ | $n_1 = 1.485$ | $v_1 = 57.66$ |
| $r_2 = \infty$ (DOE surface) | | |
| $d_2 = 3.637$ | | |
| $r_3 = 1.97$ | | |
| $d_3 = 3.17$ | $n_2 = 1.54$ | $v_2 = 54$ |
| $r_4 = \infty$ | | |
| aspherical surface coefficients | | |
| (surface $r_1$) | $P = 0.327$, $E = -0.1494 \times 10^{-4}$, | |
| | $F = -0.2866 \times 10^{-5}$, $G = 0.4006 \times 10^{-7}$ | |
| (surface $r_2$) | $P = -0.84 \times 10^6$, $E = -0.1494 \times 10^{-4}$, | |
| | $F = 0.2866 \times 10^{-5}$, $G = -0.4006 \times 10^{-7}$ | |

This projector optical system (seventh example) adopts, as the second surface $r_2$, a DOE surface which is designed by the ultra-high index methods. The DOE surface (an ultra-high index lens) has a refractive index of 1487 and an Abbe's number of −3.45. Further, the surface $r_1$ has a refractive power of 0.237, whereas the surface $r_2$ has a refractive power of −0.168. The seventh example has a rear principal point at a distance of −1.2 mm from a vertex of the first surface toward an object to be photographed. Further, the surfaces $r_1$ and $r_2$ are configured as aspherical surfaces.

This projector optical system (seventh example) has a short total length and a high aberration correcting capability, and can easily be manufactured in practice since it uses, as the second surface, a DOE surface which is macroscopically planar.

Figure 17:
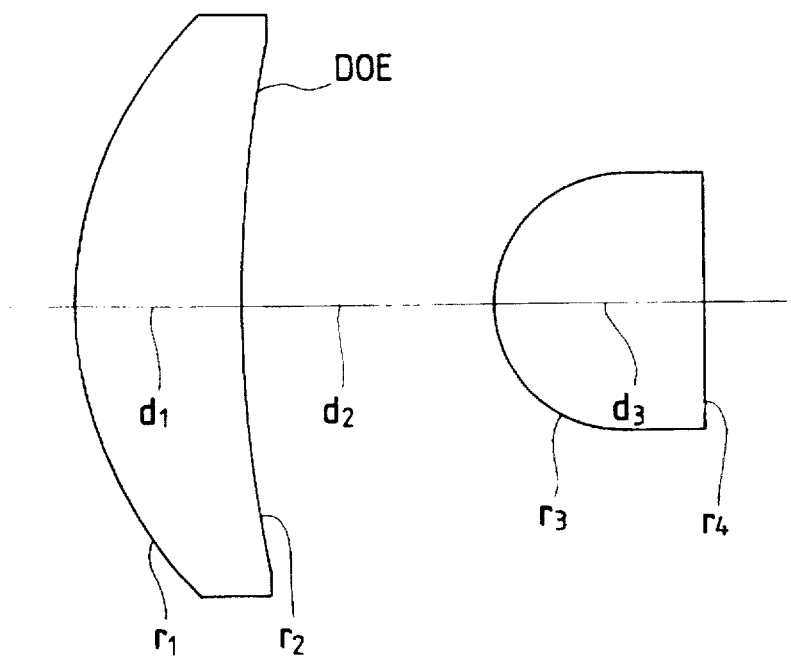
FIG. 17 shows a sectional view illustrating an eighth example of the projector optical system to be used in the second embodiment of the present invention.

Shown in FIG. 17 is an eighth example of the projector optical system which has the following numerical data:

eighth example

| | | |
|---|---|---|
| $r_1 = 5.81$ | | |
| $d_1 = 2.5$ | $n_1 = 1.485$ | $v_1 = 57.66$ |
| $r_2 = 20.00$ (DOE surface) | | |
| $d_2 = 3.886$ | | |
| $r_3 = 1.97$ | | |
| $d_3 = 3.17$ | $n_2 = 1.54$ | $v_2 = 54$ |
| $r_4 = \infty$ | | |
| aspherical surface coefficients | | |
| (surface $r_1$) | $P = 0.2678$, $E = -0.8844 \times 10^{-4}$, | |
| | $F = 0.6557 \times 10^{-6}$, $G = 0.6111 \times 10^{-6}$ | |
| (surface $r_2$) | $P = 0.993$, $E = -0.4376 \times 10^{-7}$, | |
| | $F = 0.8445 \times 10^{-8}$, $G = 0.4291 \times 10^{-10}$ | |

The projector optical system described above (eighth example) uses, as the second surface $r_2$, a DOE surface designed by the ultra-high index methods. This DOE surface (an ultra-high index lens) has a refractive index of 1487 and an Abbe's number of −3.45. The second surface $r_2$ has a refractive power of 0.43. The eighth example has a rear principal point at a distance of −1.1 mm from a vertex of the first surface toward an object to be photographed. Further, the surfaces $r_1$ and $r_2$ are aspherical surfaces.

This projector optical system (eighth example) can hardly be contaminated, and has a high aberration correcting capability and high transmittance since it uses, as the second surface, the DOE surface which is macroscopically curved.

When a direction of the optical axis is taken as the x axis, a direction perpendicular to the optical axis is taken as the y axis and a curvature on a vertex of an aspherical surface is represented by C, each of the aspherical surfaces used in the embodiments of the present invention is expressed by the following formula:

$$x = Cy^2/[1+(1-pC^2y^2)^{1/2}] + Ey^4 + Fy^6 + Gy^8$$

wherein the reference symbol p represents a conical constant, and the reference symbols E, F and G designate aspherical surface coefficients of the fourth, sixth and eighth orders respectively.

In FIG. 10 through FIG. 16, the reference symbols $r_3$ and $r_4$ represent the package 21, and a light emitting surface is disposed close to the planar surface $r_4$.

Now, description will be made of methods for designing the optical elements having the DOE surfaces and the optical systems which comprise the optical elements having the DOE surfaces.

Figure 18:
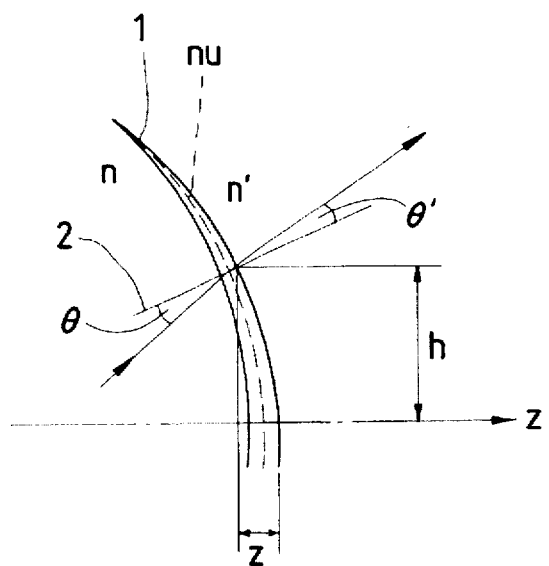
FIG. 18 shows a diagram descriptive of the ultrahigh index method.

For designing diffraction type optical elements and other types of optical elements, known to those skilled in the art are the ultra-high index methods which are described in detail in SPIE Vol. 126, P46 through P53 (1977). These methods will be described briefly below with reference to FIG. 18:

In FIG. 18, the reference numeral 1 represents a medium of a refractive lens (an ultra-high index lens) which has a refractive index $n \gg 1$, a reference numeral 2 designates a normal to the refractive lens, the reference symbol z denotes an axis on a coordinates system in a direction of an optical axis and the reference symbol h represents an axis on the coordinates system in a direction of a base plate.

Applicable to an ultra-high index lens is the following formula (31):

$$(n_U - 1)\, dz/dh = n \sin \theta - n' \sin \theta' \qquad (31)$$

wherein the reference symbol $n_U$ represents a refractive index of the ultra-high index lens, the reference symbol z designates a distance measured in the direction of the optical axis, the reference symbol h denotes a distance as measured from the optical axis, the reference symbols n and n' represent refractive indices of media which are located on the side of incidence and the side of emergence respectively, and the reference symbols θ and θ' designate an angle of incidence and an angle of emergence respectively. In the numerical data of the embodiments of the present invention described above, $n_U$ has a value of 10.001. In the first embodiment, for example, each of $n_3$ and $n_7$ has the value of 10.001. Further, applicable to a diffraction grating is the following equation (32):

$$n \sin \theta - n' \sin \theta' = m \lambda/d \qquad (32)$$

From the equations (31) and (32), we obtain the following formula (33):

$$(n_U - 1)\, dz/dh = m \lambda/d \qquad (33)$$

That is to say, equivalent relationship given by the above-mentioned equation (32) establishes between a surface shape of an ultra-high index lens (a refraction type lens having an extremely high refractive index) and a groove pitch on a diffraction type optical element. This equation allows a pitch distribution on a diffraction type optical element to be determined from a shape of a surface of an ultra-high index lens which is designed by the ultrahigh index methods.

Speaking more concretely of an ultra-high index lens which is designed so as to have an aspherical surface expressed by a formula (34) shown below, the formulae (33) and (34) allow a pitch distribution on a diffraction type optical element to be expressed by a formula (35) shown below:

$$z = (ch^2)/\{1 - c^2(k+1)h^2\}^{1/2} \qquad (34)$$
$$\quad + Ah^4 + Bh^6 + Ch^8 + Dh^{10}$$

$$d = m\lambda/\{(n-1)(dz/dh)\} \qquad (35)$$
$$\quad = \{m\lambda/(n-1)\}/[ch/\{1 - c^2(k+1)h^2\}^{1/2}$$
$$\quad + 4Ah^3 + 6Bh^5 + 8Ch^7 + 10Dh^9]$$

wherein the reference symbol z represent a departure (sag value) from a plane which is in contact with the lens on the optical axis, the reference symbol c designates curvature, the reference symbol h denotes a distance as measured from the optical axis, the reference symbol k represents a conical constant, and the reference symbols A, B, C, D, . . . designate aspherical surface coefficients of the fourth, sixth, eighth, tenth, . . . orders respectively.

As understood from the foregoing description, the optical elements having the DOE surfaces as well as the aspherical surfaces which are used in the embodiments of the present invention can be manufactured in practice.

Figure 19:
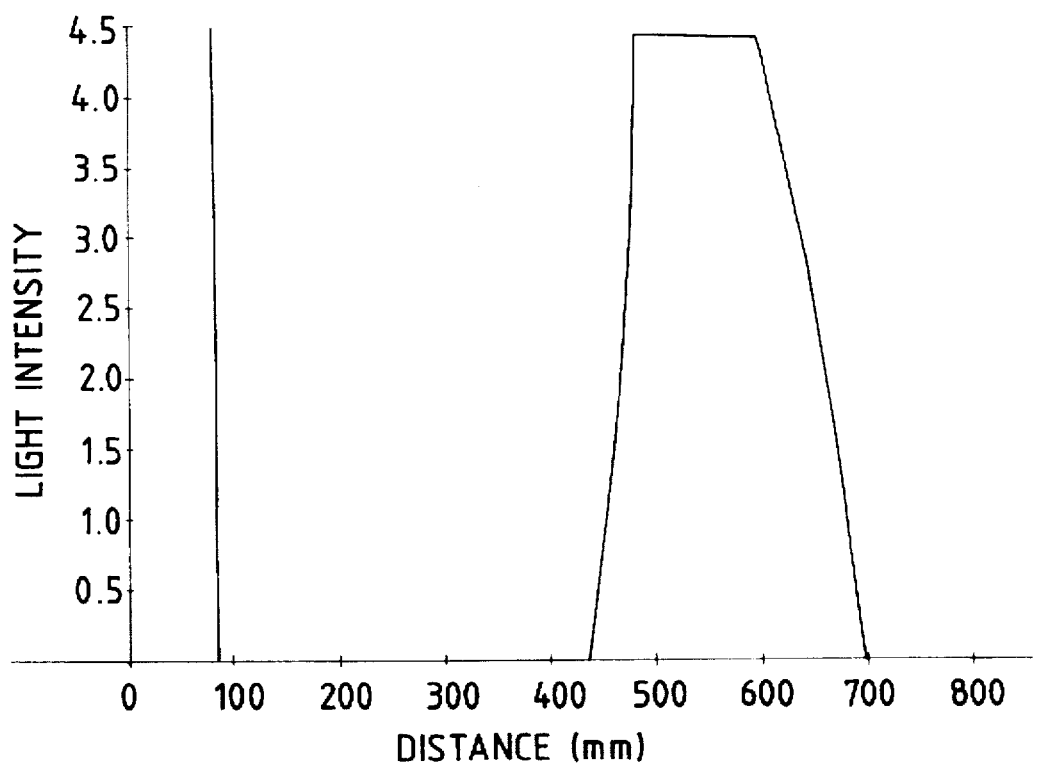
FIG. 19 shows a diagram illustrating a distribution of light intensities on an object to be photographed which is obtained by the sixth example of the projector optical system.

FIG. 19 is a diagram illustrating a light intensity on an object to be photographed which is located at an object distance of 5 m and illuminated with the projector optical system (sixth example) which comprises the light projector lens shown in FIG. 15. In this drawing wherein distances in a direction perpendicular to the optical axis are plotted along the abscissa and light intensities are plotted along the ordinate, symmetry of light intensities with regard to the optical axis is represented as symmetry with regard to a vertical axis and light intensities only in the rightward direction (in an upward direction, for example, on an object to be photographed. As seen from this drawing, three spots are formed on the optical axis and two points which are approximately 600 mm apart from the optical axis in the upward and downward directions respectively.

Figure 20A:
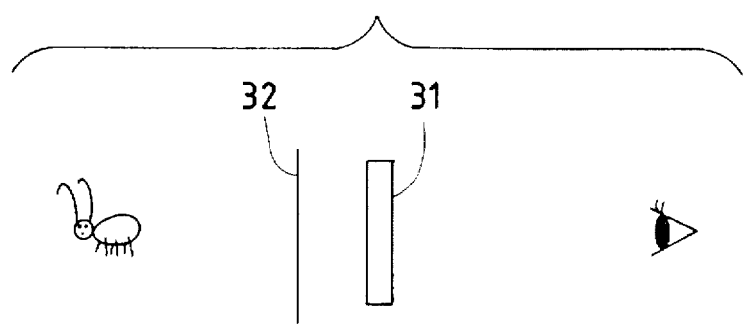
FIGS. 20A and 20B show diagrams illustrating application examples of the first embodiment of the optical element according to the present invention.
Figure 20B:
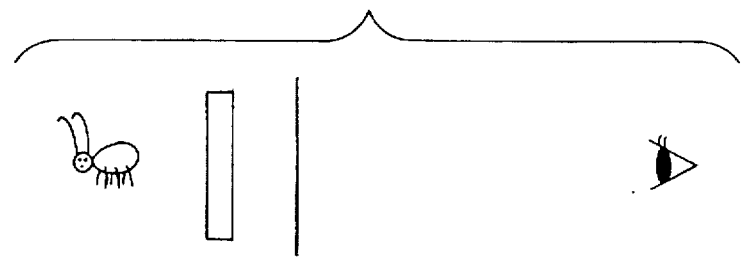

FIGS. 20A and 20B show an example where the optical element preferred as the first embodiment of the present invention is applied as a magnifying glass. Since an optical element 31 has a principal point 32 which is located outside the lens as shown in the drawing, different working distances are available with a magnification kept unchanged by setting the optical element 31 in the reverse direction.

Figure 21A:
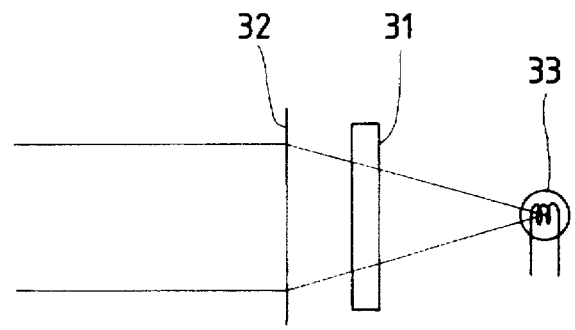
FIGS. 21A and 21B show sectional views illustrating other application examples of the first embodiment of the optical element according to the present invention.
Figure 21B:
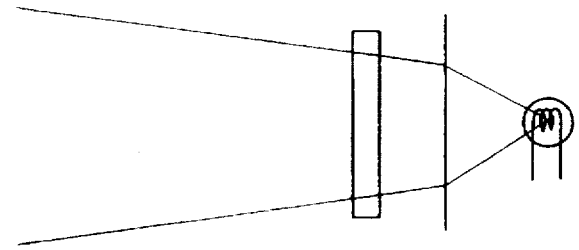

FIGS. 21A and 21B show another application example where the optical element according to the present invention is disposed before a torch lamp. Owing to a fact that to the optical element 31 has a principal point which is located outside the lens, it allows divergence of rays emitted from the lamp by setting the optical element in the reverse direction.

The optical element according to the present invention is almost free from degradation of its optical characteristics or reduction of light intensity, and permits locating its principal point away from a center of the lens. Further, the focal point detecting optical system according to the present invention which uses this optical element is almost free from degradation of its optical performance or reduction of light intensity and can have a short total length.

I claim:

1. An optical element comprising:

a light incident surface having an optical power; and a light emitting surface having an optical power, wherein said optical element has a rear principal point located before a center of thickness of said optical element and a front principal point located after said center of thickness of said optical element, and at least one of said light incident surface and said light emitting surface is a diffracting surface.

2. An optical element which has a rear principal point located before a center of thickness thereof or a front principal point located after the center of thickness thereof and at least one surface which functions as a lens by utilizing the diffraction phenomenon, wherein said optical element satisfies the following condition (1):

$$5.3 \times \phi_T \times n/D < \phi < 19 \times \phi_T \times n/D \qquad (1)$$

wherein the reference symbol $\phi$ represents a power of the surface of the optical element which functions as a lens by utilizing the diffraction phenomenon, the reference symbol $\phi_T$ designates a power of the optical element as a whole, the reference symbol n denotes a refractive index of the optical element and the reference symbol D represents an effective diameter of the optical element.

3. An optical element according to claim 1 wherein said optical element has, on both sides thereof, surfaces which function as lenses by utilizing the diffraction phenomenon.

4. An optical element which has a rear principal point located before a center of thickness thereof or a front principal point located after the center of thickness thereof and at least one surface which functions as a lens by utilizing the diffraction phenomenon, wherein said optical element has, on both sides thereof, surfaces which function as lenses by utilizing the diffraction phenomenon, wherein said optical element satisfies the following condition (2):

$$8 \times \phi_T \times n/D < \phi < 19 \times \phi_T \times n/D \qquad (2)$$

wherein the reference symbol $\phi$ represents a power of the surface of the optical element which functions as a lens by utilizing the diffraction phenomenon, the reference symbol $\phi_T$ designates a power of the optical element as a whole, the reference symbol n denotes a refractive index of the optical element and the reference symbol D represents an effective diameter of the optical element.

5. An optical element according to claim 1, 2, 3 or 4 said surface or surfaces functioning as a lens or lenses by utilizing the diffraction phenomenon has a power or have powers continuously or discontinuously varies or vary dependently on a position or positions of the surface or surfaces.

6. A focal point detecting optical system comprising:

a light emitting means;

a projector optical element for projecting rays emitted from said light emitting means to an object to be photographed;

a light receiving means for receiving rays reflected by the object to be photographed; and a light receiving optical element for concentrating the rays reflected by the object to be photographed onto said light receiving means, wherein said projector optical element has at least one surface which functions as a lens by utilizing the diffraction phenomenon, wherein said light receiving optical element has at least one surface which functions as a lens by utilizing the diffraction phenomenon, and said focal point detecting optical system is configured to detect a location of the object to be photographed dependently on a position of reflected rays incident on said light receiving means.

7. A focal point detecting optical system according to claim 6 wherein said projector optical element has, on a side of the object to be photographed, a surface which functions as a lens by utilizing the diffraction phenomenon and is macroscopically planar.

8. A focal point detecting optical system according to claim 6 wherein said projector optical element has, on a side of the object to be photographed, a macroscopically curved.

9. A focal point detecting optical system according to claim 6 wherein said projector optical element has two surfaces which function as lenses by utilizing the diffraction phenomenon and a surface which is macroscopically planar at least on the side of the object to be photographed.

10. A focal point detecting optical system according to claim 6 wherein said projector optical element has two surfaces which function as lenses by utilizing the diffraction phenomenon and a surface which is macroscopically curved at least on the side of the object to be photographed.

11. A focal point detecting optical system according to claim 6 wherein said projector optical system has two surfaces which function as lenses by utilizing the diffraction phenomenon and a surface which is macroscopically planar at least on a side of the light emitting means.

12. A focal point detecting optical system according to claim 6 wherein said projector optical element has two surfaces which function as lenses by utilizing the diffraction phenomenon and a surface which is macroscopically curved at least on a side of said light emitting means.

13. A focal point detecting optical system according to claim 6 wherein said projector optical element has two surfaces which function as lenses by utilizing the diffraction phenomenon and a surface which is macroscopically planar at least on a side of said light emitting means.

14. A focal point detecting optical system according to claim 6 wherein said projector optical element has a surface which functions as a lens by utilizing the diffraction phenomenon on the side of the object to be photographed and a surface which is macroscopically curved at least on a side of said light emitting means.

15. A focal point detecting optical system according to claim 6 wherein said projector optical element has a surface which functions as a lens by utilizing the diffraction phenomenon and is macroscopically planar on a side of said light emitting means.

16. A focal point detecting optical system according to claim 6 wherein said projector optical element has a surface which functions as a Lens by utilizing the diffraction phenomenon on a side of said light emitting means and a surface which is macroscopically curved at least on the side of said light emitting means.

17. A focal point detecting optical system comprising:

a light emitting means; and a projector optical element for projecting rays emitted from said light emitting means to an object to be photographed, wherein said projector optical element has at least one surface which functions as a lens by utilizing the diffraction phenomenon, and said optical element satisfies the following condition (3):

$$4.6 \times \phi_T \times n/D < \phi < 19 \times \phi_T \times n/D \qquad (3)$$

wherein the reference symbol $\phi$ represents a power of the surface of the optical element which functions as a lens by utilizing the diffraction phenomenon, the reference symbol $\phi_T$ designates a power of the optical element as a whole, the reference symbol n denotes a refractive index of the optical element and the reference symbol D represents an effective diameter of the optical element.

18. A focal point detecting optical system according to claim 17, further comprising:

a light receiving means for receiving rays reflected by the object to be photographed; and a light receiving optical element for concentrating the rays reflected by the object to be photographed onto said light receiving means, said focal point detecting optical system is configured to detect a location of the object to be photographed dependently on a position of reflected rays incident on said light receiving means.

19. A focal point detecting optical system according to claim 18, wherein said projector optical element has, on a side of the object to be photographed, a surface which functions as a lens by utilizing the diffraction phenomenon and is macroscopically planar.

20. A focal point detecting optical system according to claim 18, wherein said projector optical element has, on a side of the object to be photographed, a macroscopically curved surface.

21. A focal point detecting optical system according to claim 18, wherein said projector optical element has two surfaces which function as lenses by utilizing the diffraction phenomenon and a surface which is macroscopically planar at least on the side of the object to be photographed.

22. A focal point detecting system according to claim 18, wherein said projector optical element has two surfaces which function as lenses by utilizing the diffraction phenomenon and a surface which is macroscopically curved at least on the side of the object to be photographed.

23. A focal point detecting optical system according to claim 18, wherein said projector optical system has two surfaces which function as lenses by utilizing the diffraction phenomenon and a surface which is macroscopically planar at least on a side of the light emitting means.

24. A focal point detecting optical system according to claim 18, wherein said projector optical element has two surfaces which function as lenses by utilizing the diffraction phenomenon and a surface which is macroscopically curved at least on a side of said light emitting means.

25. A focal point detecting optical system according to claim 18, wherein said projector optical element has two surfaces which function as lenses by utilizing the diffraction phenomenon and a surface which is macroscopically planar at least on a side of said light emitting means.

26. A focal point detecting optical system according to claim 18, wherein said projector optical element has a surface which functions as a lens by utilizing the diffraction phenomenon on the side of the object to be photographed and a surface which is macroscopically curved at least on a side of said light emitting means.

27. A focal point detecting optical system according to claim 18, wherein said projector optical element has a surface which functions as a lens by utilizing the diffraction phenomenon and is macroscopically planar on a side of said light emitting means.

28. A focal point detecting optical system according to claim 18, wherein said projector optical element has a surface which functions as a lens by utilizing the diffraction phenomenon on a side of said light emitting means and a surface which is macroscopically curved at least on the side of said light emitting means.

* * * * *